(12) United States Patent
Martinez

(10) Patent No.: US 11,928,105 B2
(45) Date of Patent: Mar. 12, 2024

(54) SYSTEM FOR TRACKING DATA ASSOCIATED WITH A DIGITAL TOKEN

(71) Applicant: Ronald George Martinez, San Francisco, CA (US)

(72) Inventor: Ronald George Martinez, San Francisco, CA (US)

( * ) Notice: Subject to any disclaimer, the term of this patent is extended or adjusted under 35 U.S.C. 154(b) by 87 days.

(21) Appl. No.: 17/714,040

(22) Filed: Apr. 5, 2022

(65) Prior Publication Data

US 2022/0318233 A1 Oct. 6, 2022

Related U.S. Application Data

(60) Provisional application No. 63/170,833, filed on Apr. 5, 2021.

(51) Int. Cl.
*G06F 16/23* (2019.01)
(52) U.S. Cl.
CPC .............................. *G06F 16/2379* (2019.01)
(58) Field of Classification Search
CPC .................................................. G06F 16/2379
See application file for complete search history.

(56) References Cited

U.S. PATENT DOCUMENTS

| 10,356,128 | B1 * | 7/2019 | Lango | H04L 63/0263 |
|---|---|---|---|---|
| 10,509,914 | B1 * | 12/2019 | Desai | G06F 21/604 |
| 10,652,281 | B1 * | 5/2020 | Moolenaar | H04L 63/0236 |
| 2011/0058516 | A1 * | 3/2011 | Small | H04L 67/02 |
| | | | | 370/328 |

* cited by examiner

*Primary Examiner* — Baoquoc N To
(74) *Attorney, Agent, or Firm* — James J. DeCarlo; Greenberg Traurig, LLP

(57) ABSTRACT

This disclosure provides a novel framework that alleviates shortcomings in the art, and provides a token holder with authorized access to a range of attached functionalities, via data attachments that extend rights to token-associated digital data. According to an embodiment, a method comprises receiving a request from a holder of a token instance to provide a list of unique tokens associated with a user identifier, retrieving the list of unique tokens from a database, and transmitting the list of unique tokens to the holder. The method receives a selection of a unique token and transmits attachment data associated with the selected unique token to the holder. The method then receives interaction information indicating an interaction by the user with the attachment data, transmits a request to provide the attachment data to the user, and updates the database to reflect that the attachment data has been acted upon by the user.

20 Claims, 7 Drawing Sheets

SYSTEM FOR TRACKING DATA ASSOCIATED WITH A DIGITAL TOKEN

This application claims the benefit of provisional application No. 63/170,833 filed Apr. 5, 2021.

FIELD OF THE DISCLOSURE

The present disclosure relates generally to improving the performance of network-based content hosting and delivery by modifying the capabilities of and providing non-native functionality to devices, systems and/or platforms in a network through a novel and improved framework for generating a unique non-fungible token (NFT) and providing data and metadata associated with said NFT.

BACKGROUND

Generally, a Non-Fungible Token (NFT) is a data structure specified by an agreed upon standard (e.g., Ethereum standard ERC-721). The NFT data structure is written to a blockchain, and can be held or transferred. In the blockchain, each NFT is assigned a holder, expressed by associating a wallet address with each NFT. A wallet address may be usefully thought of as an account controlled by a person or entity who has the private keys to that address. As will be understood, wallet addresses may be hashed versions of a public key of a public/private cryptographic key pair. In this sense, the NFT is controlled by the person or entity controlling the wallet.

Some NFTs have associated metadata that provides additional functionality to the holder of the NFT. Typically, metadata is additional data associated with the NFT that may be part of its data structure. Metadata can provide holders of NFTs with access to media, the URLs/network addresses of which are included in the metadata of the NFT. For example, the token holder may be able to view a low resolution, public version of an image associated with the NFT, via a link in the metadata of the NFT. The NFT metadata may sometimes be configured to include a link to a downloadable, high resolution version of the same image, that link being available to the holder of the NFT.

However, current approaches in the art for providing data and metadata associated with an NFT to the NFT holder only provide limited functionality. Therefore, additional computing resources are needed to authenticate the holder and provide the data and metadata once the holder is redirected to where the product and service is actually hosted.

SUMMARY

Given the shortcomings in the art, a new technique is needed that synchronizes a token with corresponding attachment data or records.

This disclosure provides a novel framework that alleviates shortcomings in the art, and provides an NFT holder with authorized access to a range of attached functionalities via attachment data. According to some embodiments, the disclosed framework unlocks access mechanisms that realize, effectively, a new asset class of ownable, transferable data representing rights to any tangible or intangible thing associated with attachment data tied to an NFT.

According to an embodiment, the disclosed framework provides a generalized, flexible, and adaptable tokenized mechanism that improves the utility of cryptographic NFTs residing on a blockchain maintained by a network of cooperating computers, referred to herein as nodes. According to an embodiment, NFT issuers may attach to any NFT a broad range of attachment data including digital rights to digital or physical goods and services. In some embodiments, said attachments may be available to verified token holders. In some embodiments, access to said attachments may be accomplished by a diverse set of attachment data providers, such as physical or digital goods or service providers.

According to an embodiment, the framework provided allows token holders to exchange tokens representing digital rights. In some embodiments, the digital rights may be created and exchangeable. In some embodiments, the token issuer may add additional attached data representing accessible data or digital right available to the then-current token holder, irrespective of how many times the token may have changed hands.

As will be understood, embodiments disclosed herein may provide functionality to digital tokens and the respective token holders not only on a decentralized blockchain network, but on centralized, private servers maintained by a token issuer.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
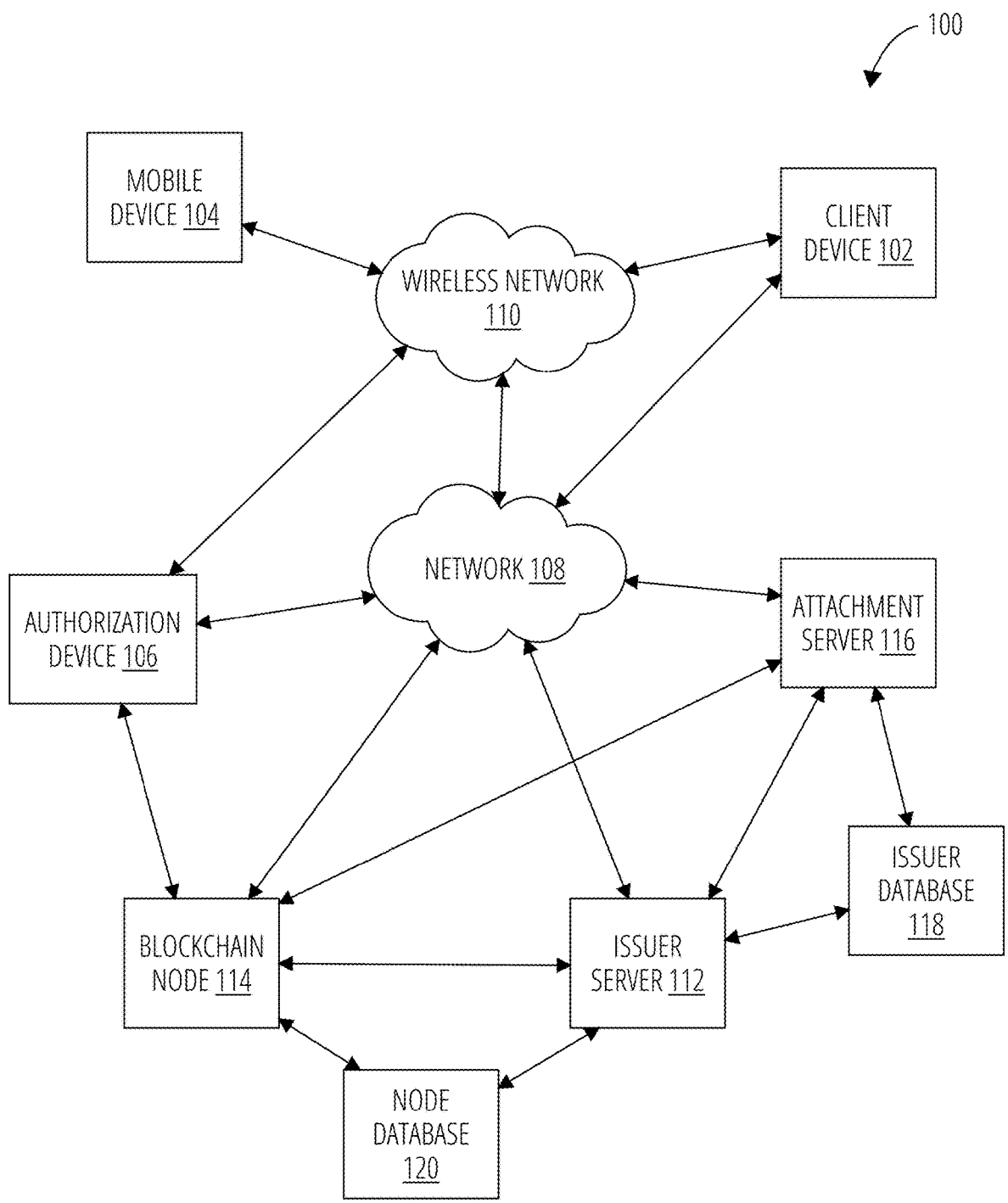
FIG. 1 depicts a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

The detailed description provided herein is not intended as an extensive or detailed discussion of known concepts, and as such, details that are known generally to those of ordinary skill in the relevant art may have been omitted or may be handled in summary fashion.

According to some embodiments, several entities interact during the generation of token and attachment instances.

Issuing Tokens

According to an embodiment, a token issuer first creates a token template (e.g., a record of structured digital data) from information provided by a user. In some embodiments, the user enters the data through a graphical user interface displayed in a user device, then the user device transmits the data to the token issuer. In some embodiments, the server receives the data, creates the token template and stores the token template in a database as a token template record. In some embodiments, the token template record may include the name of the token created with this template, descriptive text, and hyperlinks to the visual representation and other information required to visually express the token on a user's computing device. In some embodiments, tokens that may be created using this template may be made available to prospective token holders.

In some embodiments, the token issuer, depending upon the desirability or determined by other market considerations, may set a limit on availability. In other words, the token issuer can determine the number of tokens to be made available using this template. In some embodiments, the supply can effectively be infinite with a very high number set as the available supply. In some embodiments, the supply can be limited to a very low to generate interest in the token through scarcity. In some embodiments, the supply can be set to be much lower than expected to create a sense of urgency and foster interest in the token and the associated attachment data.

In some embodiments, the token template may contain the token name, description, links to visual media such as but not limited to digital graphics files stored on a third-party server or the same server, and a maximum supply designated by the token issuer or the user.

Creating Attached Data

According to an embodiment, after creating the token template, the token issuer then creates an attachment template, which specifies various types of attachment data or digital rights that are made available to the prospective holders of a token created using the token template as described above. In some embodiments, an attachment template is a record in a server's database that may include the name of the attachment, the attachment type, a description, and the identity and network or physical address of the entity that will provide the data or digital right included in the attachment.

According to some embodiments, digital rights may refer to digitally expressed rights. In some embodiments, digital rights may refer to a right to some digital media or data. In some embodiments, digital rights may refer to a right to obtain physical object or to access a physical venue. In some embodiments, digital rights may refer to a right to obtain a digital object or to access a digital venue. In some embodiments, the attachment template may also include a physical location where a physical right may be asserted. In some embodiments, accessing attachment data may include delivery and receipt of an attachment or attached data by the token holder. In some embodiments, the attachment template may also specify a specific period of time where the attached data may be accessed, or the digital or physical right be asserted. For example, in an embodiment, a token holder may be required to access attachment data the end of a calendar year or within a month.

In some embodiments, the attachment data or digital right may be attached to a token by the association of an attachment template to a token template. Specifically, each attachment template may have its own unique attachment identifier (ID), and this ID may be stored in an attachment template record. In some embodiments, multiple attachments may be attached to a token by associating each attachment template identifier corresponding to each attachment with the token template. In some embodiments, the attachments may be associated with the token templates by creating and storing a record in a database (e.g., by the issuer server).

In some embodiments, additional attachment data may be added to a token template at any time, and may become available to each then-current token holder, irrespective of how many times a particular token may have changed hands. As will be noted, in some embodiments, the use of token instances and token attachments allows for records maintained on the server. In some embodiments, said records may constitute an external overlay of attachment data or digital rights that may be applied to any token, whether issued by the token issuer maintaining the attachment data records, or by another, third party issuer, with or without their express collaboration.

Token Instances and Attachment Instances

According to an embodiment, when an end user acquires a token provided by a token issuer, a copy of the token template may be created by the server in the database. In some embodiments, this copy of the token template stored in the token issuer's database may be referred to as a token instance. In some embodiments, each token instance may be uniquely identified (e.g., a unique token identifier) by either a serialized number or a randomly generated number. In some embodiments, the unique token identifier may be 24 characters, or digits, in length. In some embodiments, this unique identifier is stored in a token instance record in a database. In some embodiments, the unique identifier may also be added to a list of token instances stored with the database record of the token template.

In some embodiments, when a user acquires a token, they are acquiring an instance, or uniquely identified copy of the token template, with its own unique token instance identifier. In some embodiments, at the point of acquisition, the token instance may be automatically generated by the server. In some embodiments, the server makes a copy of the token template and stores it in a table of instance records in a database. In some embodiments, both the token instance and the token template may have individual or unique identifiers (e.g., serialized or randomly generated strings of alphanumeric characters). In some embodiments, uniquely identifiable token instances may be created by the server by duplicating the database record of the token template, including a record of the template's identifiers, in the database. In some embodiments, this copy, the token instance, is stored along with an either randomly generated or serialized instance identifier. In some embodiments, as each token instance is generated and transferred to a new holder, the total number of available tokens may be decremented by one, such that eventually no more token instances derived from a particular token template may be available.

According to an embodiment, to effectuate the transfer to a new holder, the token instance is then associated with a unique token identifier. In some embodiments, holder identification is similar to that of the token. In some embodiments, each holder has a unique alphanumeric string stored in the holder record in the server's database. Thus, in some embodiments, a token instance may function as a possession of the holder, as the unique token instance identifier and the unique user/holder identifier may be stored in both the token instance database record and the holder database record.

According to an embodiment, once a token instance has been instantiated, copies of each attachment template associated with the token template are also instantiated. That is, in some embodiments, a uniquely identified copy of the attachment template may be created as a record in the token issuer's database, and that uniquely identified copy may be associated with the instantiated token instance, thereby allowing for attachment data or digital rights to be independently accessed or asserted, respectively, on a per-token instance basis.

For example, in an embodiment, a token template may have three attachment templates associated with it. In an embodiment, when a token is obtained, a copy of the token template may be created as a token instance, along with instances of the three attachment. Then, in an embodiment, the token instance may be associated with the acquiring user, associating the user's unique identifier as the holder of the token instance. In this way, in an embodiment, the holder is entitled to the attachment data and digital rights associated with their token instance.

For example, in some embodiments, the holder may access or assert two of the three attachment instances. In some embodiments, the accessed attachment instances may be marked as accessed or asserted, and thereafter may not be accessed again. In some embodiments, a second holder may acquire another, different token instance of the same token template, with the three associated attachment instances. In those embodiments, the user may not access any of the attachment instances. In some embodiments, the appeal of the first holder' token instance (with two of the three attachment instances accessed) may be less to a net-putative holder that the second holder's token instance, which still has three un-accessed or unasserted attachment instances.

Accessing Attachment Data

According to some embodiments, the unique identifiers allow for a determination that a user currently purporting to be the holder of a token instance is in fact the rightful holder of the token instance and therefor entitled to access the attached data. For example, in an embodiment, the token issuer's authentication service will authenticate a putative holder (e.g., verify the identity of the putative holder presenting a token instance for access to its attachments data) and either allow access to the attached data or decline to do so, per the results of the verification of the holder identity and token instance ownership.

As will be noted, in some embodiments, with non-fungible tokens stored on a decentralized blockchain, this verification may be performed by connecting a digital wallet (e.g., a cryptographically secured record of a holder's account identifiers, tokens, and transaction records) to the issuer's authentication service, as is more fully described below. As will be further noted, this level of cryptographically supported identity verification can allow for increased security for attached data with great or higher desirability. In some embodiments, to authenticate identity, the putative token holder may either be in possession of a hardware wallet with account access credentials stored on a hardware wallet device, or be in possession of a difficult to guess passphrase composed of 12, 18, or as many as 24 short English language words chosen from a pool of hundreds of words.

According to some embodiments, some token instance identifiers and holder identifiers may be created and stored in conventional, centralized databases operated by a particular server controlled by a single entity. In those embodiments, the token instances and identifiers may be accessible with a simple login and password, thereby allowing embodiments described herein to be applied across a wide range of population and transaction types. Still, in some embodiments, additional security surety may be required. Thus, some embodiments described herein allow, per the specification of the token or attachment data provider, to create a record of the token on a blockchain. As will be understood, a blockchain is a distributed ledger maintained by numerous (in some cases thousands) computing devices coordinating via cryptographic protocols to maintain an unalterable, synchronized copy of a database of identities, tokens, and transactions.

Thus, in some embodiments, a token instance as described herein may be "minted" (e.g., created as an unalterable record) on a blockchain, and assigned to a similarly unalterable and strongly authenticated blockchain identity of the token holder. In some embodiments, the form such blockchain instantiating takes is that of a non-fungible toke (NFT). In some embodiments, an NFT is of the type specified by the Ethereum standards ERC-721 or ERC-1155.

As will be noted, irrespective of the particular blockchain, each NFT standard provides for a unique identification of an NFT token record by the token issuer, through assignment and storage on the blockchain of the unique token identifier generated and provided by the token issuer. In some embodiments, when "minted" or created as a record on the blockchain, the minting process adds a unique identifier of the blockchain-based entity that creates the NFT (sometimes known as a "smart contract"). As will be understood, in some embodiments, a smart contract may be a program that resides and operates upon the blockchain, as opposed to residing and operating on a privately operated server. In some embodiments, if the token has been minted using a smart contract, a smart contract identifier is added to the token issuer's privately managed record of the particular token. In some embodiments, the attachment data associated with an NFT may be minted separately by third parties.

In some embodiments, once minted on a blockchain, the token instance may be accessed and transferred independent of the original token issuer's servers and services. For example, in some embodiments, ownership of the token may be transferred without any interaction with the token issuer's services. In some embodiments, processes provided here allow for access to attachment data or assertion of a digital right associated with a blockchain-based NFT token created by unaffiliated third parties. In those embodiments, the token issuer, may provide an attachment data access service and may also register the unique identifier of the Smart Contract used to create an externally minted set of NFT tokens. In some embodiments, the token issuer may attach attachments to any or all of the individually identified tokens minted by that externally operated and owned smart contract. In some embodiments, processes described herein allow for the creation of and access services for attachment data for any NFT created by any service.

Access to Attachment Data

According to some embodiments, a minted token holder's blockchain-managed identity may be a unique account identifier, and may only be accessed by an entity or person in possession of cryptographically based credentials. In some embodiments, the entity or person may be authenticated using multi factor methods including but not limited to shared secrets, biometric data, or hardware-supported access (e.g., something the user knows, is or has physically, or possesses).

According to some embodiments, access to attached data may be accomplished by requiring the token instance holder to access an attached data access website operated by a token issuer. In some embodiments, the token instance holder may log into the token issuer server with holder credentials (e.g., an email address and password). In some embodiments, where the token instance has been minted on a blockchain, the token holder may connect a cryptographically assured digital wallet to the attached data service. As will be noted, in some embodiments, the attached data access service may be a web application available through the use of a web browser. In some embodiments, the aforementioned digital wallet connection process provides the token issuer's attached data access service with the blockchain-based identifier of the token holder. For example, in an embodiment, after receiving the cryptographically assured identifier obtained from the putative holder's digital wallet, the issuer's attached data access service may now access the blockchain and the token holder's identity and associated accounts, including any token instance they possess.

In some embodiments, once the putative holder accesses the redemption website, the holder selects a token instance associated with the attached data they would like to access. In some embodiments, if the token instance is not found in the putative holder's possession (e.g., the token instance record is not found to be associated with the holder's wallet address on the blockchain), the putative token holder is informed that they do not possess the token, and the attached data may not be provided to the then-connected putative token holder. In some embodiments, if the selected uniquely identified token instance is found to be associated with the putative token holder, the holder may request access to or delivery of any as yet not-accessed or not-asserted attachment data or digital right.

Attachment Types and Access Mechanisms.

As will be noted, there may be a wide variety of attachment types implementable using embodiments described herein. For example, in some embodiments, an attachment template may specify as its attachment type: access to a physical venue (e.g., a digital ticket), an article of clothing, a digital file (e.g., audio, video, image, eBook, document, 3D object, and the like), a physical item (e.g., a cultured pearl, a limited edition vinyl toy), a service (e.g., a half hour consultation with a business expert and author), a license (e.g., to some intellectual property), a right to operate a franchise service, another digital token, member access to a club or community, early access to a concert ticket or limited edition consumer good (e.g., with the attachment data including instructions to purchase the specified item), a form of content (e.g., an audiovisual presentation or online graphic novel streamed from a server), a product yet to be produced (e.g., a limited edition bottle of Bordeaux from a celebrated winery to be produced three years from the time of purchase), a vacation rental (e.g., which may be purchased in the low season but asserted in the high season).

In some embodiments, to implement and support this expansive range of attachment types, embodiments described herein receive all types of information required for access or assertion of the attachment such that this information can be both supplied by those providing the attachment data or digital right, and also by the holder requesting access to the attached data or assertion of the digital right. For example, in an embodiment, when creating an attachment template for an attachment of the type: article of clothing, a server may receive from the digital right provider a full and complete description of the article of clothing and provide a size chart for the prospective holder's convenience. In some embodiments, the holder requesting access to or assertion of the clothing-type digital right may be presented with a size dropdown to specify their preference. In some embodiments, once that information is obtained at the point of access or assertion, it may be sent via an application programing interface (API), email, or other communications to the entity charged with providing the attachment data or digital right. In some other embodiments, for example, where the attachment data or digital right is a consultation service, the holder may be required to provide contact information to enable the consultant to set up an appointment for the consultation.

In some embodiments, where the attachment data or digital right is an eBook delivery, the attachment data/right provider may upload the digital eBook file to an attachment server so and stored in its database. In some embodiments, to access the file, the token holder may authenticate to the attachment data service, select the eBook, and have the eBook file downloaded to their device or alternatively, provisioned to their account on a third party service that streams the pages to the reader on demand.

Third Part Tokens with Attached Data or Digital Right

According to some embodiments, a redemption service as described herein allows for public inspection of the access or asserted status of each of the attached data or right to a token. As will be noted, this functionality allows for access to or assertion of to the attachment data/digital right to a subsequent holder of the token on the blockchain, as any prospective holder of any token to which such attachments may confirm which data or right have as yet not been accessed or asserted.

Extensible Attachment Data or Digital Right

According to some embodiments, an attachment data access or issuer entity may maintain attachment data records synchronized with all token instances of a particular token template, to support the ongoing provision of new attachment data. For example, in an embodiment, when an attachment template is created and associated with a token template, the token issuer server may go through a database and create and associate with each already issued token instance new, unique attachment data of the new attachment template. Thus, in some embodiments, the attachment data/right is available to the current token instance holder, even if the token instance has changed hands.

In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes mobile devices/client device 102-104, local area networks (LANs)/wide area networks (WANs)—network 108, and wireless network 110. System 100 may additionally include a variety of servers, such as an issuer server 112 and attachment server 116.

One embodiment of mobile devices 102-104 is described in more detail below. Generally, however, mobile devices 102-104 may include virtually any portable computing device capable of receiving and sending a message over a network, such as network 108, wireless network 110, or the like. Mobile devices 102-104 may also be described generally as client devices that are configured to be portable. Thus, mobile devices 102-104 may include virtually any portable computing device capable of connecting to another computing device and receiving information, as discussed above. In some embodiments, system 100 may optionally include an authorization device 106 to validate an NFT or an attachment at a physical location. For example, in an embodiment, the authorization device 106 may be used to scan an attachment or a link to an attachment in order to access the attachment data or assert a digital right associated with the attachment at a venue (e.g., arena, theater). In some embodiments, the authorization device 106 is a client device 102 or a mobile device 104 as described herein.

Mobile devices 102-106 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-106 may uniquely identify themselves through any of a variety of mechanisms, including a phone number, Mobile Identification Number (MIN), an electronic serial number (ESN), or other mobile device identifier. In some embodiments, the client application may be an attachment access application used by authorization device 106 to access or assert attached data or digital right.

In some embodiments, mobile devices 104-106 may also communicate with non-mobile client devices, such as client device 102, or the like. Client device 102 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, in some embodiments, devices 102-106 may also have differing capabilities for displaying navigable views of information.

Devices 102-106 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple devices 104-106 and its components with network 108. Wireless network 110 may include any of a variety of wireless sub-networks that may further overlay stand-alone ad-hoc networks, and the like, to provide an infrastructure-oriented connection for devices 102-106. Such sub networks may include mesh networks, Wireless LAN (WLAN) networks, cellular networks, and the like.

Network 108 is configured to couple issuer server 112, blockchain node 114, attachment server 116, or the like, with other computing devices, including client devices 102 and 106, and through wireless network 110 to mobile device 104. Network 108 is enabled to employ any form of computer readable media or network for communicating information from one electronic device to another. Also, network 108 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

In some embodiments, the disclosed networks 108 and/or 110 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The issuer server 112 may include a device that includes a configuration to provide any type or form of content via a network to another device. Devices that may operate as issuer server 112 include personal computers, desktop computers, multiprocessor systems, microprocessor-based or programmable consumer electronics, network PCs, servers, and the like. Issuer server 112 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like.

The issuer servers 112 may allow users (e.g., NFT holders or prospective holders) to obtain token instances and access attachment instances to obtain the attached data or assert an attached digital right. The issuer server 112 may communicate with the issuer database 118 to store and maintain token templates, token instances, attachment templates, attachment instances, unique identifiers, and holder/user information. In some embodiments, the issuer server 112 may communicate with attachment server 116 to provide the attached data. In some embodiments, an attachment server 116 may receive a request to validate a token holder from the authorization device 106 and, in turn may provide the authorization device 106 with instructions to enable access to the attached data or assertion of a digital right. According to an embodiment, the attachment server 116 may be operated by an attachment data services provider. In some embodiments, the attachment data services provider may be the issuer server 112.

According to some embodiments, the issuer server 112 may communicate with a blockchain node 114. As will be understood, in some embodiments, a blockchain node may be one of a plurality of connected computing devices (e.g., through networks 108-110), each maintaining the coordinated state of the collective, publicly available, synchronized blockchain and smart contracts. As will be further understood, in some embodiments, a smart contract is a uniquely identified program that execute on the blockchain via the blockchain node 114. In some embodiments, the blockchain node 114 may communicate with node database 120 to store and maintain a blockchain and/or smart contracts. In some embodiments, blockchain node database 120 may store holder account identifiers, assets (e.g., NFTs), and transaction records. In some embodiments, each blockchain node may coordinate with each other blockchain node to store and maintain identical unalterable data in the corresponding node database 120 to each node.

In some embodiments, services provided by blockchain node 114 and attachment server 116 can be provided via the issuer server 112, whereby a user is able to utilize such service upon the user being authenticated, verified or identified by the service. For example, in some embodiments, content or data related to an attachment may include images, text, audio, video, or the like, which may be processed in the form of physical signals, such as electrical signals, for example, or may be stored in memory, as physical states. In some embodiments, content or data related to an attachment may be stored in the issuer database 118 or the node database 120.

Issuer server 112, blockchain nodes 114, and attachment server 116 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like.

In some embodiments, users are able to access services provided by issuer server 112, blockchain node(s) 114, and attachment server 116. This may include, in a non-limiting example, authentication servers, search servers, email servers, social networking services servers, SMS servers, IM servers, MMS servers, exchange servers, photo-sharing services servers, and multimedia servers via the network 108 and/or wireless network 110 using their various devices 102-106.

In some embodiments, applications, such as, but not limited to, news applications (e.g., Yahoo! Sports®, ESPN®, Huffington Post®, CNN®, and the like), mail applications (e.g., Yahoo! Mail®, Gmail®, and the like), streaming video applications (e.g., YouTube®, Netflix®, Hulu®, iTunes®, Amazon Prime®, HBO Go®, and the like), instant messaging applications, blog, photo or social networking applications (e.g., Facebook®, Twitter®, Instagram®, and the like), search applications (e.g., Yahoo!® Search), and the like, can be hosted by the issuer server 112, a blockchain node 114, the attachment server 116, and the like.

Thus, the issuer server 112, blockchain node 114, and attachment server 116, for example, can store various types of applications and application related information including application data and user profile information (e.g., identifying and behavioral information associated with a user). It should also be understood that issuer server 112 can also store various types of data related to the content and services provided by issuer server 112 and the attachment server 116 in an associated issuer database 118.

Moreover, although FIG. 1 illustrates issuer server 112, blockchain node(s) 114, and attachment server 116 as single computing devices, respectively, the disclosure is not so limited. For example, one or more functions of servers 112, 114, and/or 116 may be distributed across one or more distinct computing devices. Moreover, in one embodiment, servers 112, 114, and/or 116 may be integrated into a single computing device, without departing from the scope of the present disclosure.

Figure 2:
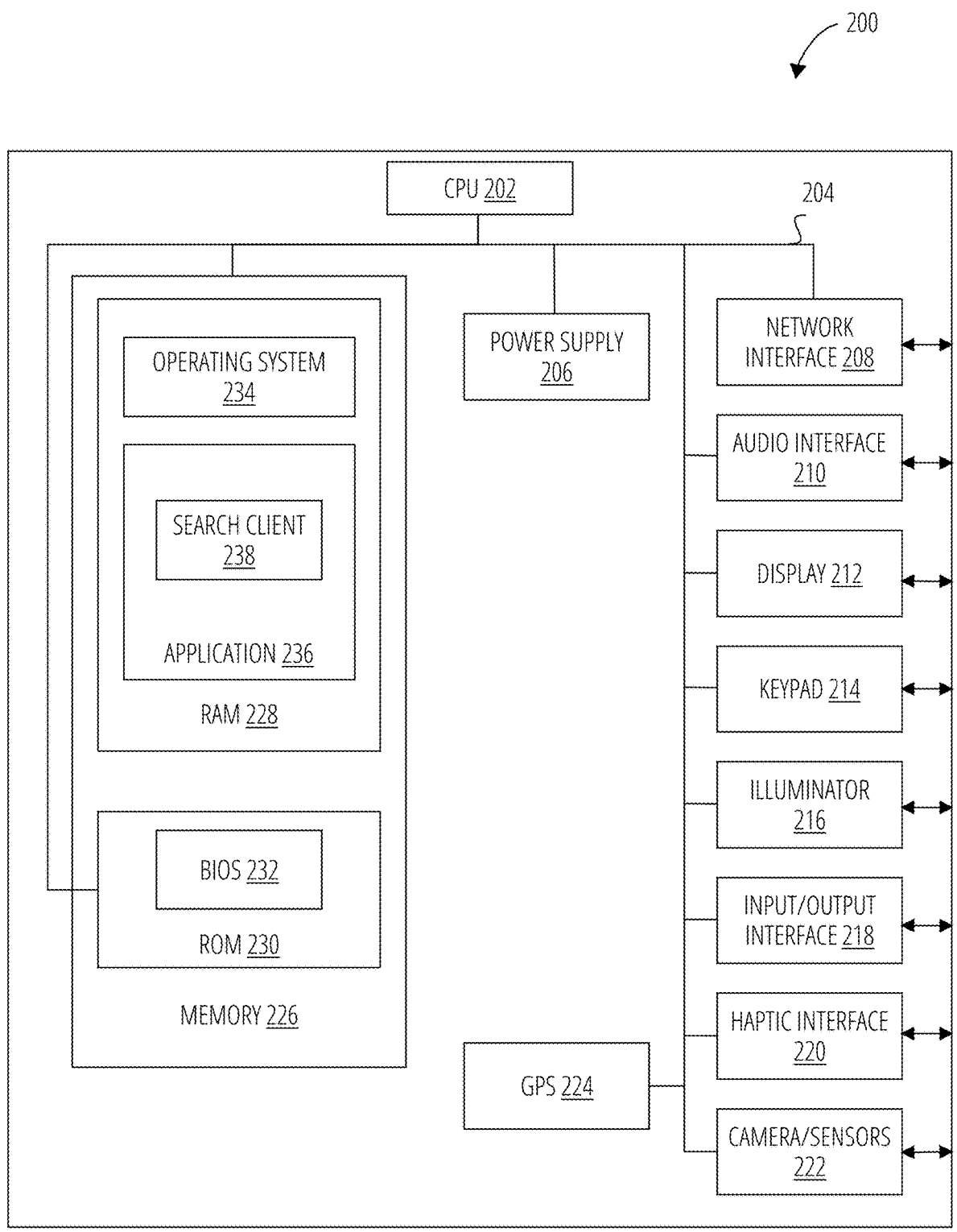
FIG. 2 depicts a schematic diagram illustrating an example of client device in accordance with some embodiments of the present disclosure.

FIG. 2 is a schematic diagram illustrating an example embodiment of a device 200 (e.g., a client device) that may be used within the present disclosure. Device 200 may include many more or less components than those shown in FIG. 2. However, the components shown are sufficient to disclose an illustrative embodiment for implementing the present disclosure. Device 200 may represent, for example, devices 102-106 discussed above in relation to FIG. 1.

As shown in the figure, device 200 includes a processing unit (CPU) 202 in communication with a mass memory 226 via a bus 204. Device 200 also includes a power supply 206, one or more network interface 208, an audio interface 210, a display 212, a keypad 214, an illuminator 216, an input/output interface 218, a haptic interface 220, an optional global positioning systems (GPS) receiver 224 and a camera(s) or other optical, thermal, or electromagnetic sensor 222. Device 200 can include one camera/sensor 222, or a plurality of cameras/sensors 222, as understood by those of skill in the art. Power supply 206 provides power to device 200.

Device 200 may optionally communicate with a base station (not shown), or directly with another computing device. Network interface 208 is sometimes known as a transceiver, transceiving device, or network interface card (NIC).

Audio interface 210 is arranged to produce and receive audio signals such as the sound of a human voice. Display 212 may be a liquid crystal display (LCD), gas plasma, light emitting diode (LED), or any other type of display used with a computing device. Display 212 may also include a touch sensitive screen arranged to receive input from an object such as a stylus or a digit from a human hand.

Keypad 214 may comprise any input device arranged to receive input from a user. Illuminator 216 may provide a status indication and/or provide light.

Device 200 also comprise input/output interface 218 for communicating with external. Input/output interface 218 can utilize one or more communication technologies, such as USB, infrared, Bluetooth™, or the like. Haptic interface 220 is arranged to provide tactile feedback to a user of the device.

Optional GPS transceiver 224 can determine the physical coordinates of device 200 on the surface of the Earth, which typically outputs a location as latitude and longitude values.

Mass memory 226 includes a random-access memory (RAM) 228, a read-only memory (ROM) 230, and other storage means. Mass memory 226 illustrates another example of computer storage media for storage of information such as computer readable instructions, data structures, program modules or other data.

Mass memory 226 further includes one or more data stores, which can be utilized by device 200 to store, among other things, applications 236 and/or other information or data. For example, data stores may be employed to store information that describes various capabilities of device 200.

Applications 236 may include computer executable instructions which, when executed by device 200, transmit, receive, and/or otherwise process audio, video, images, and enable telecommunication with a server and/or another user of another client device. Applications 236 may further include search client 238 that is configured to send, to receive, and/or to otherwise process a search query and/or search result.

Having described the components of the general architecture employed within the disclosed systems and methods, the components' general operation with respect to the disclosed systems and methods will now be described below.

Figure 3:
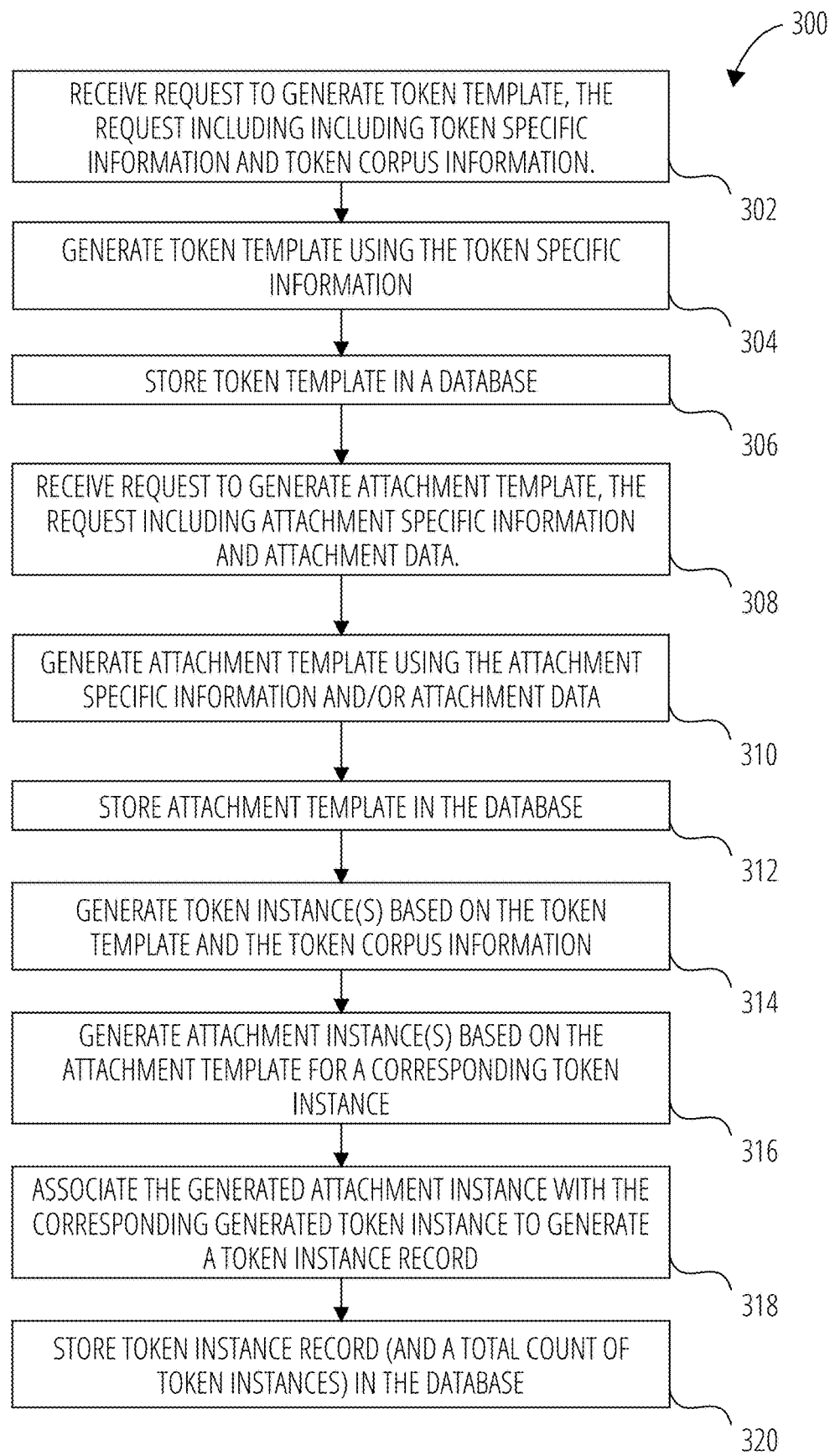
FIG. 3 illustrates a process for generating token and attachment templates in accordance with embodiments of the present disclosure.

Turning to FIG. 3, Process 300 details non-limiting embodiments for generating token and attachment templates in accordance with embodiments of the present disclosure. Process 300 begins with Step 302, where a server (e.g., issuer server 112) receives a request to generate a token template. In some embodiments, the request may be sent by a user from a client device (e.g., client device 102-104). In some embodiments, the request may include token specific information. In some embodiments, the token specific information includes a name, description, type of associated media, attachment, or benefit (e.g., image, video, and the like). In some embodiments, the request may include token corpus information. In some embodiments, the token corpus information may include the total number of tokens to be instantiated for a given token template. In some embodiments, the token corpus information may include a purchase price and a currency type. In some embodiments, the token corpus information may include an availability designation for the token (e.g., public or private).

In Step 304, the server generates a token template based on the token specific information, the token corpus information, or a combination of both. In some embodiments, generating the token template includes arranging the token specific information, the token corpus information, or a combination of both into a token data structure (e.g., as illustrated in the non-limiting embodiment of FIG. 7). Then, in Step 306, the server stores the token template in a database (e.g., issuer database 118).

In Step 308, the server receives a request to generate an attachment template. In some embodiments, the request may include attachment specific information and/or attachment data. In some embodiments, the attachment specific information may include a name, a description, media file (e.g., an image, a video, and the like). In some embodiments, the attachment specific information may include an attachment type. In some embodiments, the attachment type may be a venue entry (e.g., the right to access a venue or event), a physical good (e.g., the right to purchase or obtain a physical good), a digital file (e.g., the right to access and/or download a digital file), a token, content (e.g., the right to access, download, and/or obtain content), apparel, a choice between two or more attachments, an early access purchase, and/or a combination thereof. In some embodiments, for example where the attachment type is an early access purchase, the attachment specific information may include a purchase price and currency. In some embodiments, the attachment specific information may include a date range during which the attachment (e.g., a right to purchase, a download, access, etc.) may be accessed or asserted.

In some embodiments, an initial holder of a token may access or assert attached data or digital right and then transfer the token instance to another holder. In those embodiments, the attachment specific information may include an indication that the attachment will be extended to subsequent holders of the associated with the attachment. That is, in some embodiments, new holders of the token, may also have access or be able to assert the attached data or digital right. In some embodiments, the server may maintain a record of whether an attachment instance (e.g., the attached data or digital right) has been accessed or asserted and/or whether the attached data or digital right is still available for access or assertion by the holder or to subsequent holders. For example, in an embodiment, the server may maintain a record of whether a supply of physical good attachments runs out.

In some embodiments, the request to generate an attachment template may also include attachment data. In some embodiments, the attachment data includes links and/or media files that may be accessed or downloaded by a token holder.

Then, in Step 310, the server generates the attachment template using the attachment specific information, the attachment data, or a combination of both. In Step 312, the server stores the attachment template in the database.

In Step 314, the server generates a token instance based on the token template and the token corpus information. In some embodiments, where the token corpus information indicates a total number of tokens to be instantiated greater than one, in Step 314, the server generates a number of token instances corresponding to the total number of tokens to be instantiated.

In Step 316, for each token instance, the server generates an attachment instance. In some embodiments, where each token has more than one attachment, the server generates all the attachment instances corresponding to each token. In some embodiments, a token may have multiple attachments of different types. In those embodiments, the server generates the attachment instances based on the corresponding attachment template and attachment data.

In Step 318, the server associates each token instance with the corresponding attachment instance or instances to generate a token instance record. In Step 320, the server stores the token instance record and corresponding attachment instance(s) in the database. In some embodiments, in Step 320, the server may also store and maintain a record of the total number of token instances generated.

Figure 4:
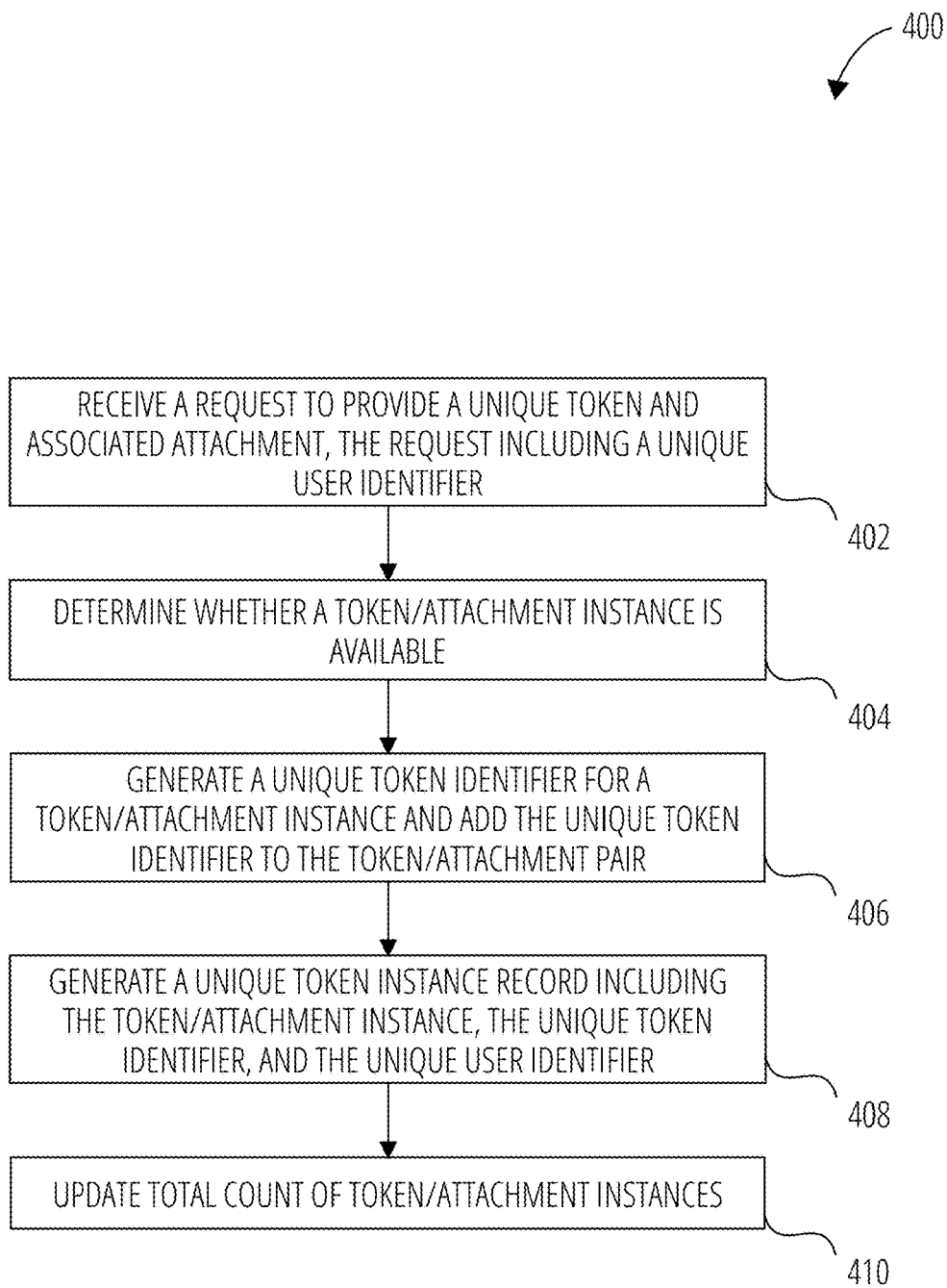
FIG. 4 illustrates a process for providing a token instance and associated attachment in accordance with embodiments of the present disclosure.

Turning to FIG. 4, Process 400 details non-limiting embodiments for creating and providing a token instance and associated attachment in accordance with embodiments of the present disclosure. Process 400 begins with Step 402, where a server (e.g., issuer server 112) receives a request to create and provide a unique token. In some embodiments, the unique token is an NFT. In some embodiments, the request includes a unique user identifier. As will be noted, in some embodiments, the unique user identifier may be a digital wallet identifier or account credentials associated with a user (e.g., the holder). In some embodiments, the unique user identifier may be an alphanumeric string.

In Step 404, the server determines whether there are any available token instances (e.g., as described in FIG. 4) to be provided. That is, in some embodiments, determining whether there are any available token instances includes determining whether there are any token instances that do not have an associated holder. In some embodiments, the server determines whether the total number of token instances is sufficient to satisfy the request. If so, the Process 400 continues to Step 406. If not, the request is denied.

In Step 406, the server generates a unique token identifier for a token/attachment instance and adds the unique token identifier to the token/attachment instance. In some embodiments, the unique token identifier is a serialized or randomized string of alphanumeric characters. In some embodiments, adding a unique identifier to a token/attachment instance includes modifying a token data structure to add the unique token identifier to the token data structure. In some embodiments, adding the unique token identifier to the token/attachment instance generates a unique token instance (e.g., a unique token, unique NFT).

In Step 408, the server generates a unique token instance record including the token/attachment instance, the unique token identifier, the unique user identifier, or a combination thereof; and stores the unique token instance record in the database.

Then, in Step 410, the server updates total count of token/attachment instances to reflect the number of remaining token/attachment instances available and/or allocated.

Figure 5:
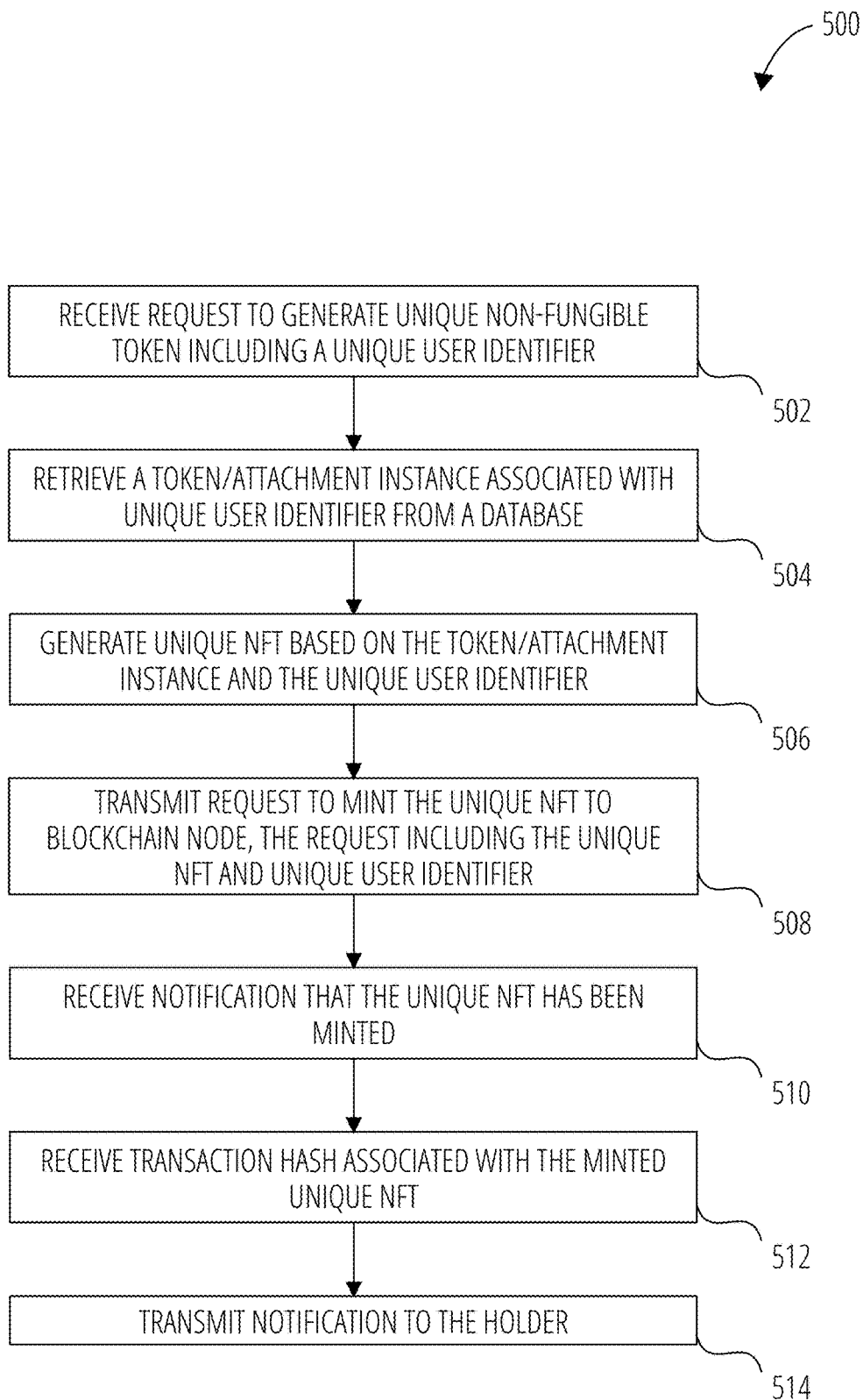
FIG. 5 illustrates a process for minting a token instance to the blockchain in accordance with embodiments of the present disclosure.

Turning to FIG. 5, Process 500 details non-limiting embodiments for minting a token instance to the blockchain in accordance with embodiments of the present disclosure. Process 500 begins with Step 502, where a server receives a request to generate a unique non-fungible token. In some embodiments, the request may include a unique user identifier. In some embodiments, the request is generated by a user or holder from a client device. In those embodiments, the holder may access a cryptographically managed digital wallet hosted on the server through the client device and provide a unique user/holder or account identifier as recorded on the public blockchain.

In Step 504, the server retrieves a token/attachment instance (e.g., as described in FIG. 3 and FIG. 4) associated with the unique user identifier from a database (e.g., issuer database 118, node database 120).

Figure 7:
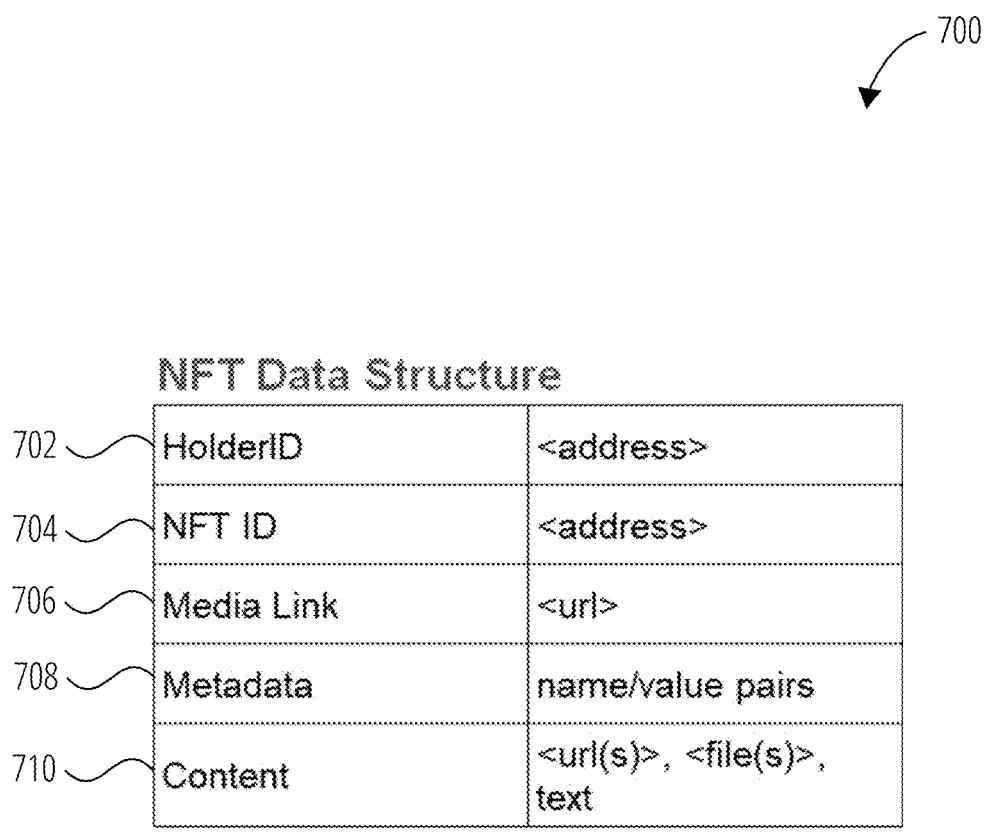
FIG. 7 illustrates a non-limiting example embodiment of an NFT structure according to some embodiments of the present disclosure.

In Step 506, generates a unique NFT based on the token/attachment instance and the unique user identifier. In some embodiments, the server creates a new data structure (e.g., a token data structure 700 as shown in FIG. 7) that includes the token/attachment instance and a unique token/attachment instance identifier. In some embodiments, the unique NFT generated in Step 506 may be generated according to an NFT standard data specification. In those embodiments, the unique NFT may be referred to as a unique standardized NFT.

In Step 508, the server transmits a request to mint the unique NFT to a blockchain node. In some embodiments, the request includes the unique NFT and the unique user identifier. In some embodiments, the request is transmitted to a smart contract service. As will be understood a smart contract service may be an NFT-creating blockchain program that is operating on the destination blockchain and corresponding blockchain node. As will be noted there are various blockchains and, in some embodiments, the determination of which one to use to mint the unique NFT may be undertaken automatically by the server or the holder.

According to some embodiments, the smart contract creates an NFT record indicating that the unique NFT is allocated or corresponds to the unique user identifier, and presents that record to the selected blockchain network where blockchain nodes validate the record data, and store the newly-created NFT record on the blockchain. In some embodiments, that record, identified by a unique alphanumeric string called a transaction hash, propagates across the databases of all nodes in the blockchain, thereby synchronizing the transaction and asset records across network of nodes.

In Step 510, the server receives a notification that the unique NFT has been minted. In turn, in Step 514, the server may notify the holder that the unique standardized NFT has been minted (e.g., by sending a message).

Optionally, in Step 512, the server may receive the transaction hash associated with the minted unique NFT and transmit it to the holder. In some embodiments, upon receiving the transaction hash, the holder may independently inspect the NFT record to confirm that the unique NFT has been minted and that the holder is identified as the holder of the newly-minted unique NFT.

Figure 6:
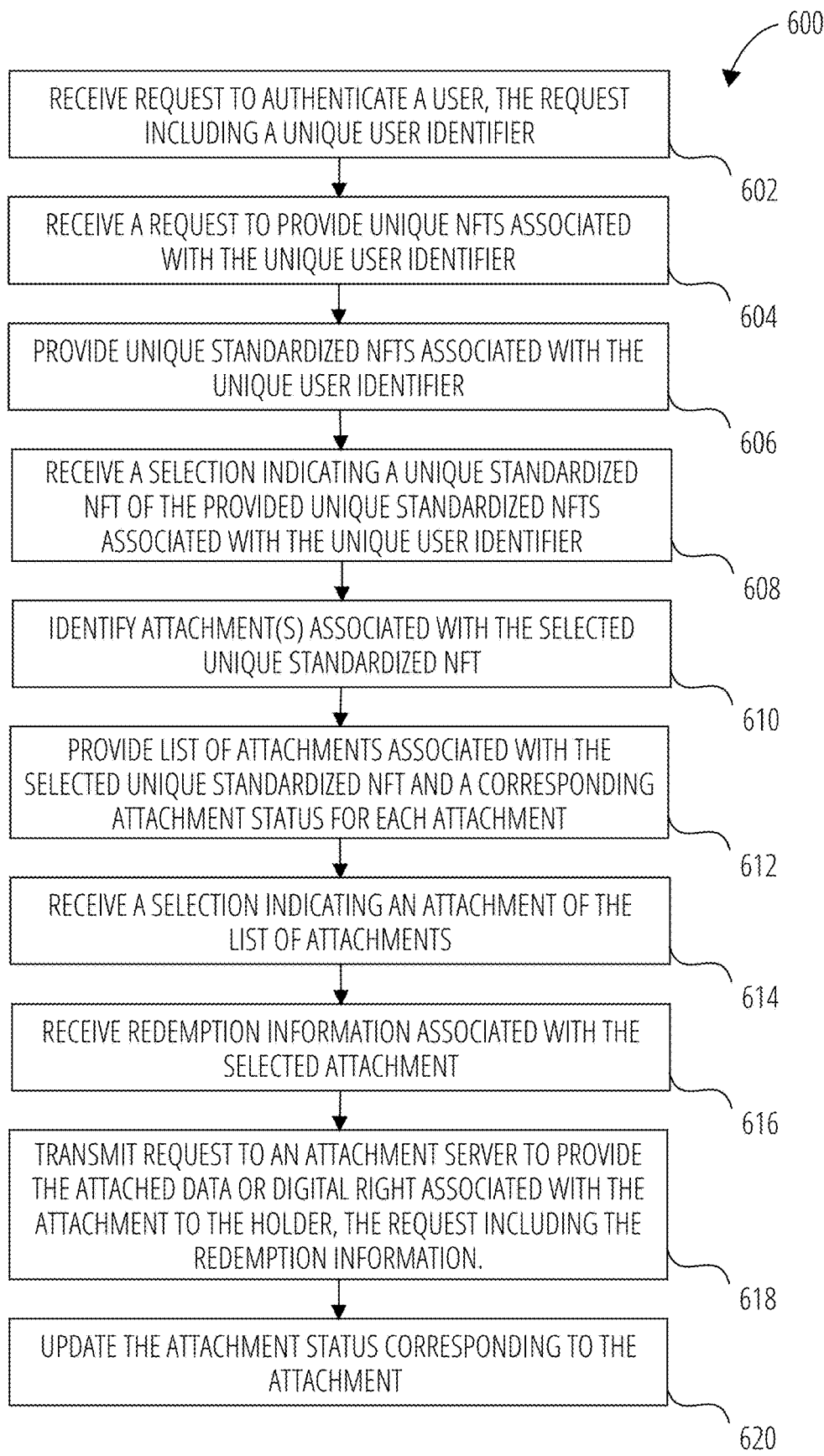
FIG. 6 illustrates a process for redeeming an attachment in accordance with embodiments of the present disclosure.

Turning to FIG. 6, Process 600 details non-limiting embodiments for accessing or asserting an attachment and/or digital right in accordance with embodiments of the present disclosure. Process 600 begins with Step 602, where a server receives a request to authenticate a user (e.g., a putative holder). In some embodiments, the request may include a unique user identifier. In some embodiments, the request may include other entity, user, or token holder credentials (e.g., username and password). In some embodiments, the request may be transmitted by the holder of a token instance from a client device. In some embodiments, for example, the holder may visit a webpage (e.g., hosted by the server) in the client device and provides user credentials either by connecting their crypto wallet to the server or by logging in with a username and password. As will be noted, the server may use any authentication method known or to be known without departing from the scope of the present disclosure.

Once the user is authenticated, in Step 604, the server receives a request to provide a list of the unique NFTs associated with the unique user identifier. In some embodiments, the server may search a database to identify and retrieve all unique NFTs associated with a unique user identifier. In some embodiments, the server may compile all unique NFTs associated with a unique user identifier into a list.

In Step 606, the server provides the list of all the unique NFTs associated with the unique user identifier.

In Step 608, the server receives a selection indicating a unique NFT of the provided unique NFTs associated with the unique user identifier. In some embodiments, the server receives a selection indicating the selection of a unique NFT of the list of unique NFTs. In some embodiments, the selection is made by the user in the client device. In some embodiments, the server may search a database for the unique NFT selected by the user.

Then, in Step 610, the server identifies the attachment or attachment instances associated with the selected unique NFT. And, in Step 612, the server provides a list of attachments associated with the selected unique NFT and a corresponding attachment status for each attachment. In some embodiments, the attachment status indicates whether the attachment has been access or asserted. In some embodiments, in Step 612, the server provides attachment data associated with the selected unique NFT.

In Step 614, the server receives a selection indicating an attachment of the list of attachments. In some embodiments, the attachment is an attachment that has not been accessed or asserted. In some embodiments, in Step 614, the server receives interaction information indicating that a user has interacted with the attachment data (e.g., followed a link, downloaded a file).

Optionally, in Step 616, the server may also receive reply instructions associated with the selected attachment. In some embodiments, the reply instructions may be generated by or associated with the user interaction with the attachment data. In some embodiments, reply instructions may include indications for a server (e.g., issuer server 112 or attachment server 116) to transmit, deliver, or provide the attachment or attachment data to the user. For example, in some embodiments, where the attachment includes a right to receive a physical object, the reply instructions may include an address and contact information of the user/holder. In some embodiments, where the attachment includes a right to download a file, the reply instructions may include an email address of the user/holder where to send the file or a link to download the file. In some embodiments, the server optionally may confirm the validity of the received reply instructions (e.g., by validating a zip code and/or checking the completeness of provided information).

In Step 618, the server transmits a request to an attachment data services provider (e.g., attachment server 116) to provide the attachment or attached data to the holder. In some embodiments, the request to the attachment data services provider may include the reply instructions. In some embodiments, instead of transmitting the request to the attachment data services provider, the server may directly use the reply instructions to provide the attachment or attached data to the user.

In optional Step 620, the server may update the attachment status corresponding to the attachment. For example in an embodiment, the server may modify the attachment instance to indicate that the attachment has been accessed (e.g., downloaded, obtained) thereby preventing that the attachment or attached data is accessed or asserted more than once. In some embodiment, if the attached data or digital right may be enjoyed repeatedly (e.g., it is of content type) the attachment instance is not marked as accessed or asserted.

According to an embodiment, to support repeated transfers of unique NFTs with associated attachments (e.g., through OpenSea) the server may make the attachment status of any attachment or attached data publicly available. In some embodiments, the server receives the unique NFT identifier either from a URL parameter appended to an attachment access address, or from a user (e.g., by entering it as text into a form field in attachment access page's user interface), or by any other method known or to be known. Then, in some embodiments, the server may search its database for the unique NFT identifier and obtains database records for the attachment instances.

Finally, the server may provide a list of the attachment instances to the user through a client device, indicating, visually or manifesting in some other way the attachment status status of each attachment instance. For example, in an embodiment, a user interface displayed in the client device may show a label that says "ACCESSED."

FIG. 7 illustrate a non-limiting example embodiments of an NFT data structure according to some embodiments of the present disclosure. As shown, in some embodiments, an NFT data structure may include a holder identifier 702, a unique NFT identifier 704, a media link 706, metadata 708, and content/data 710. In some embodiments, the content 710 may be a link to content or data hosted by a third party in a third party server.

According to an embodiment, a method is provided to authenticate a holder and allow access to attachment data associated with a unique token. In some embodiments, the method comprises receiving a request to access attachment data associated with a unique token instance, the request including a unique holder identifier of a requesting holder; retrieving, from a database, a token instance record associated with the unique token instance, the token instance record including a verified unique holder identifier of the current holder of the unique token instance; comparing the unique holder identifier with the verified unique holder identifier; and providing access to the attachment data based on whether the unique holder identifier and the verified unique holder identifier match. In an embodiment, determining that a unique holder identifier and a verified unique holder identifier includes determining that at least a portion of each identifier is the same for both identifiers.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method comprising:
   receiving a request from a holder of a token instance to provide a list of unique tokens associated with a unique user identifier corresponding to a user, the request including the unique user identifier;
   retrieving from a database the list of unique tokens associated with the unique user identifier;

transmitting the list of unique tokens to the holder of a token instance;
receiving a selection indicating the selection of a unique token of the list of unique tokens;
transmitting attachment data associated with the selected unique token to the holder of a token instances;
receiving interaction information indicating an interaction by the user with the attachment data;
transmitting a request to provide the attachment data to the user; and
updating the database to reflect that the attachment data has been acted upon by the user.

2. The method of claim 1, further comprising receiving reply instructions associated with the interaction, and wherein the request to provide the attachment data includes the reply instructions.

3. The method of claim 1, wherein the request to provide the attachment data includes a link.

4. The method of claim 1, wherein the unique token is based on a token instance and an attachment instance.

5. The method of claim 4, wherein the token instance and the attachment instance are generated by an issuer based on a token template and an attachment template, respectively.

6. The method of claim 1, wherein the unique token is generated based on the unique user identifier.

7. The method of claim 6, wherein the unique token is minted using a smart contract thereby generating a unique standardized token.

8. A non-transitory computer-readable storage medium, the computer-readable storage medium including instructions that when executed by a computing device, cause the computing device to:
receive a request from a holder of a token instance to provide a list of unique tokens associated with a unique user identifier corresponding to a user, the request including the unique user identifier;
retrieve from a database the list of the unique tokens associated with the unique user identifier;
transmit the list of unique tokens to the holder of a token instance;
receive a selection indicating the selection of a unique token of the list of unique tokens;
transmit attachment data associated with the selected unique token to the holder of a token instance;
receive interaction information indicating an interaction by the user with the attachment data;
transmit a request to provide the attachment data to the user; and
update the database to reflect that the attachment data has been acted upon by the user.

9. The computer-readable storage medium of claim 8, wherein the instructions further cause the computing device to receive reply instructions associated with the interaction, and wherein the request to provide the attachment data includes the reply instructions.

10. The computer-readable storage medium of claim 8, wherein the request to provide the attachment data includes a link.

11. The computer-readable storage medium of claim 8, wherein the unique token is based on a token instance and an attachment instance.

12. The computer-readable storage medium of claim 11, wherein the token instance and the attachment instance are generated by an issuer based on a token template and an attachment template, respectively.

13. The computer-readable storage medium of claim 8, wherein the unique token is generated based on the unique user identifier and wherein the unique token is minted using a smart contract thereby generating a unique standardized token.

14. A computing device comprising:
a processor configured to:
receive a request from a holder of a token instance to provide a list of unique tokens associated with a unique user identifier corresponding to a user, the request including the unique user identifier;
retrieve from a database the list of the unique tokens associated with the unique user identifier;
transmit the list of unique tokens to the holder of a token instance;
receive a selection indicating the selection of a unique token of the list of unique tokens;
transmit attachment data associated with the selected unique token;
receive interaction information indicating an interaction by the user with the attachment data;
transmit a request to provide the attachment data to the user to the holder of a token instance; and
update the database to reflect that the attachment data has been acted upon by the user.

15. The computing device of claim 14, wherein the processor is further configured to receive reply instructions associated with the interaction, and wherein the request to provide the attachment data includes the reply instructions.

16. The computing device of claim 14, wherein the unique token is based on a token instance and an attachment instance.

17. The computing device of claim 16, wherein the token instance and the attachment instance are generated by an issuer based on a token template and an attachment template, respectively.

18. The computing device of claim 14, wherein the unique token is generated based on the unique user identifier.

19. The computing device of claim 18, wherein the unique token is minted using a smart contract thereby generating a unique standardized token.

20. A method comprising:
receiving a request to access attachment data associated with a unique token instance, the request including a unique holder identifier of a requesting holder;
retrieving, from a database, a token instance record associated with the unique token instance, the token instance record including a verified unique holder identifier of a current holder of the unique token instance;
comparing the unique holder identifier with the verified unique holder identifier; and
providing access to the attachment data based on whether the unique holder identifier and the verified unique holder identifier match.

* * * * *